July 9, 1957 E. G. STAUDE 2,798,567
STABILIZING SYSTEM FOR VEHICULAR POWER STEERING
Filed Oct. 23, 1956 4 Sheets-Sheet 2
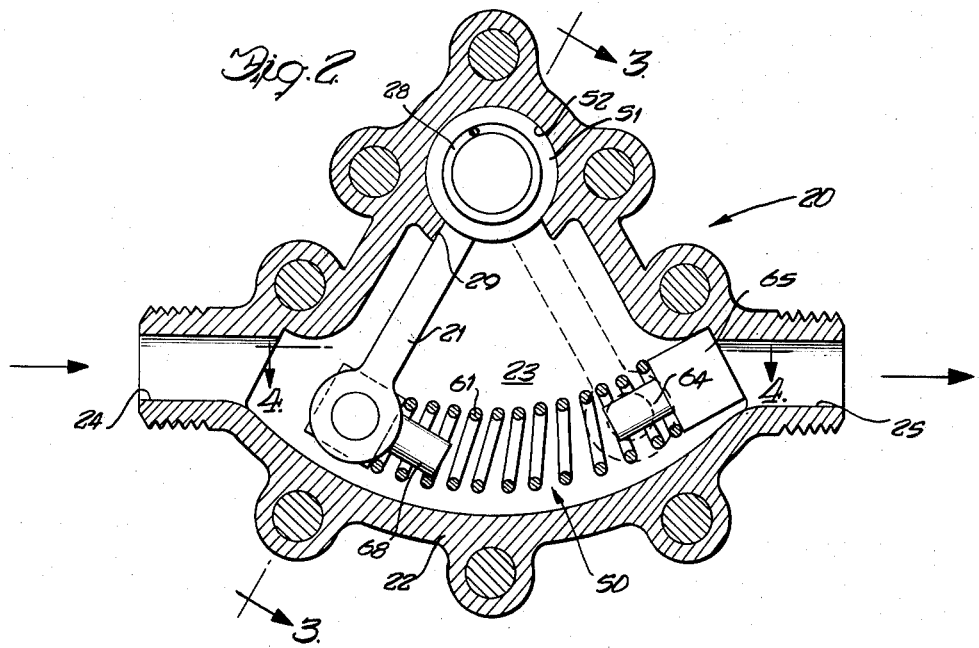
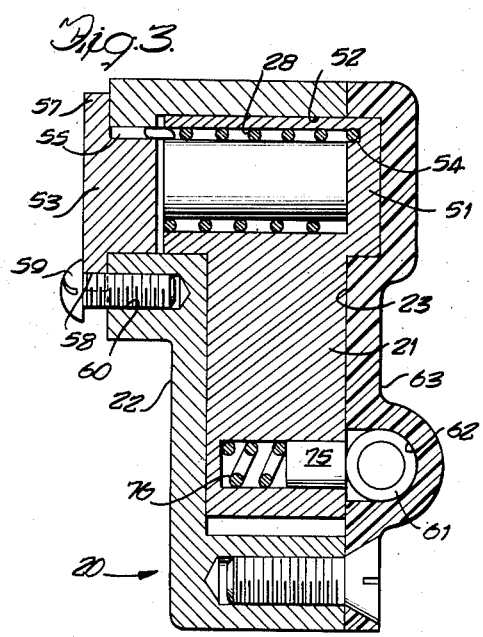 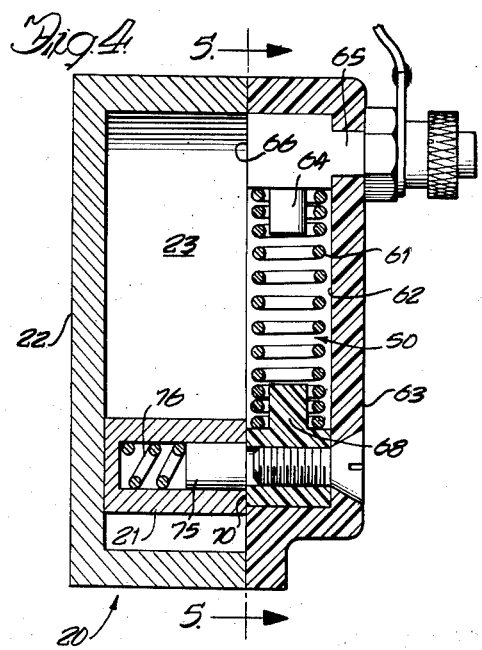
Inventor
Edwin G. Staude
Carlson, Pitzner, Hubbard & Wolfe
Attorneys July 9, 1957 E. G. STAUDE 2,798,567
STABILIZING SYSTEM FOR VEHICULAR POWER STEERING
Filed Oct. 23, 1956 4 Sheets-Sheet 3
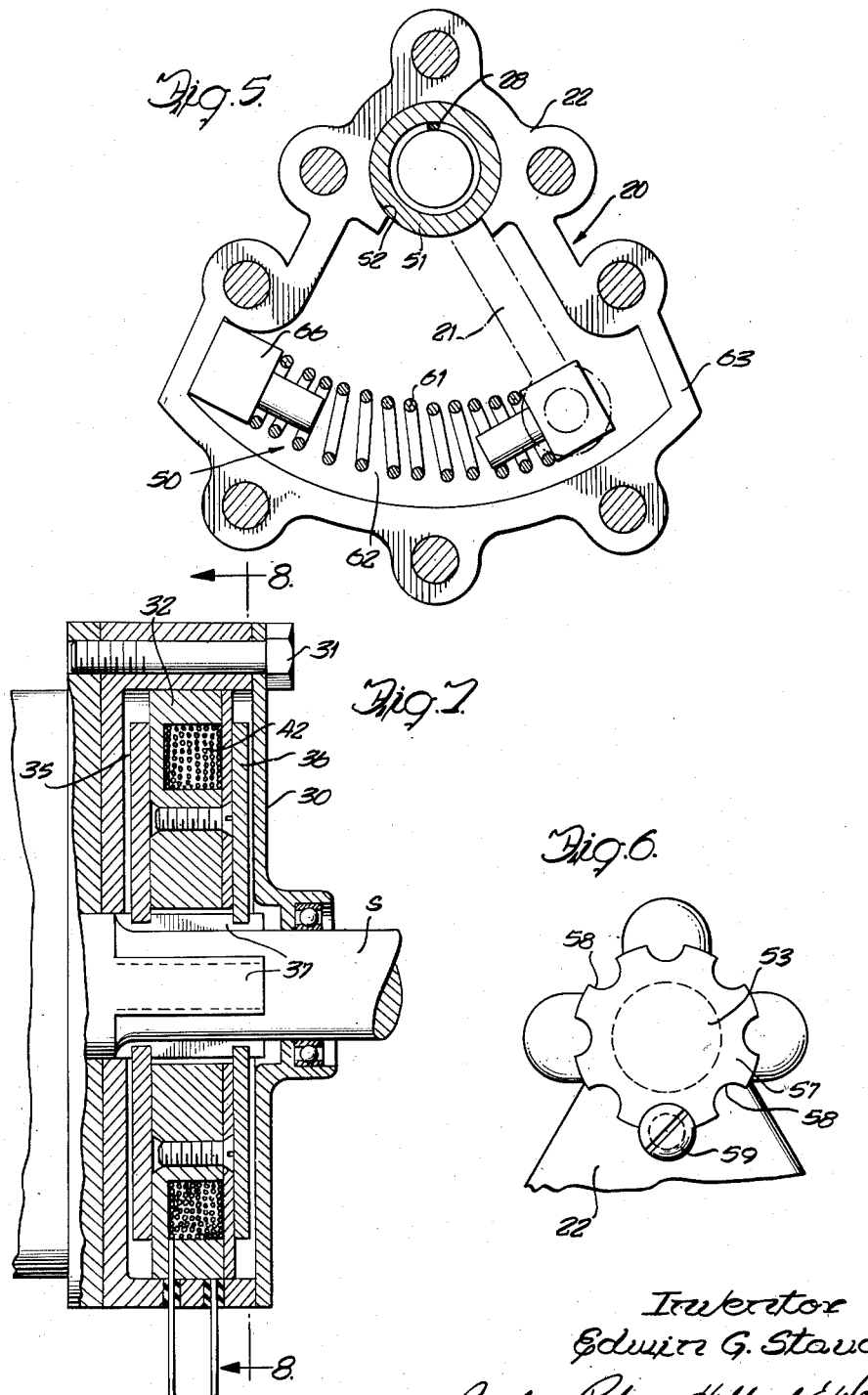
Inventor
Edwin G. Staude
Carlson, Pitzner, Hubbard & Wolfe
Attorneys July 9, 1957 E. G. STAUDE 2,798,567
STABILIZING SYSTEM FOR VEHICULAR POWER STEERING
Filed Oct. 23, 1956 4 Sheets-Sheet 4

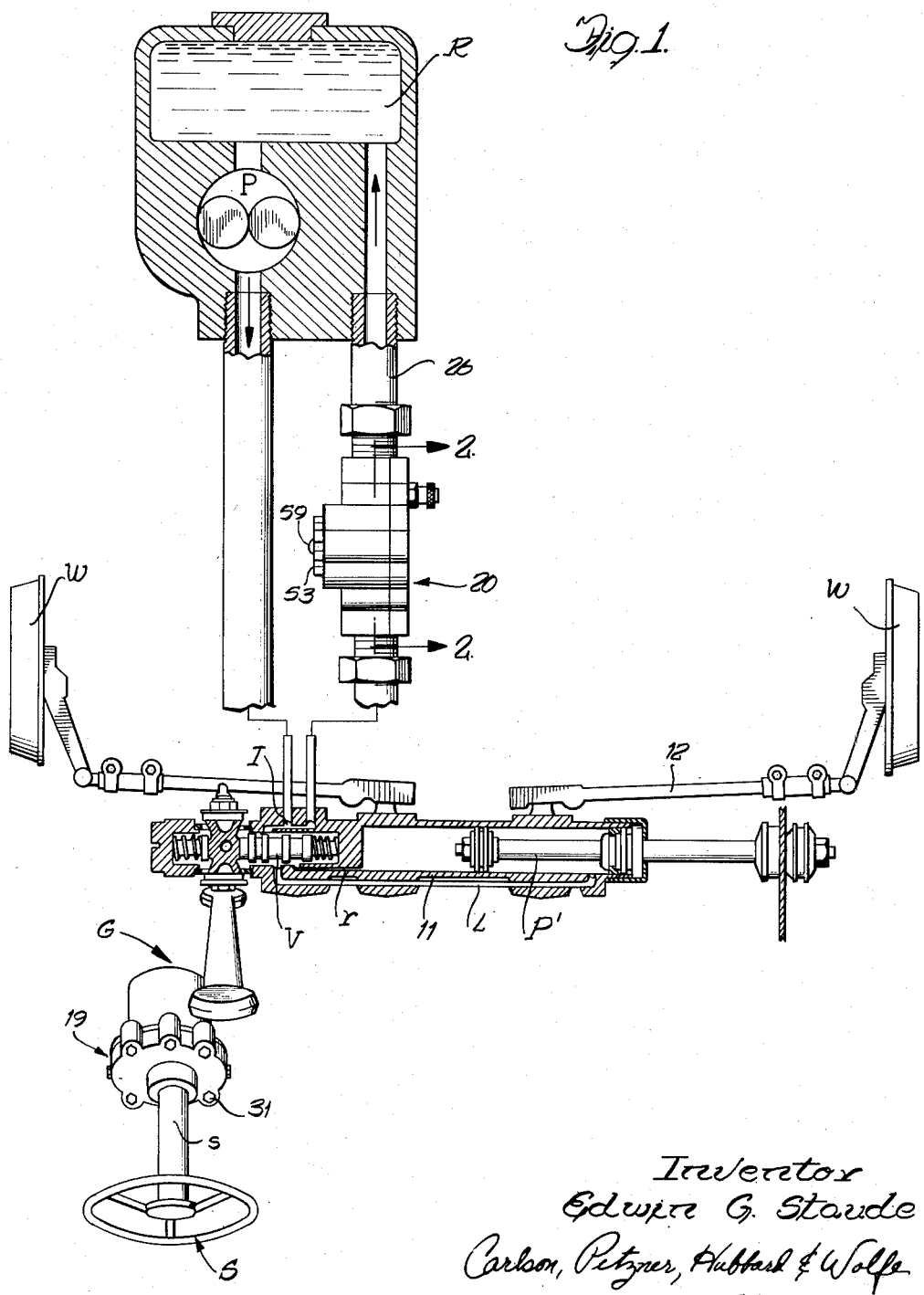

Inventor
Edward G. Staude
Carlson, Pitzner, Hubbard & Wolfe
Attorneys

United States Patent Office 2,798,567
Patented July 9, 1957

2,798,567

STABILIZING SYSTEM FOR VEHICULAR POWER STEERING

Edwin G. Staude, Los Angeles, Calif., assignor of one-half to Olive B. Staude

Application October 23, 1956, Serial No. 617,858

7 Claims. (Cl. 180—79.2)

The present invention relates in general to power steering systems for motor vehicles and has particular reference to a method and means for vehicle power steering systems for restoring ground feel lost at highway speeds.

It is a general object of this invention to provide in a power steering system, a device capable of offering a resistance to steering wheel movement and which is automatically operated to be effective at high vehicle speeds to compensate for the loss of ground feel experienced at such speeds.

A more detailed object of this invention is to provide a device functioning as aforesaid in the form of a brake coupled to the steering shaft of a vehicle provided with power steering, for interposing resistance to turning the steering shaft for restoring ground feel, the brake when engaged being effective to interpose a fixed value of resistance which remains substantially constant at a given vehicle engine speed irrespective of the rate of turning of the steering shaft.

Another more detailed object of this invention is to provide a control for operating the brake at a predetermined vehicle speed.

By compensating for the loss of ground feel experienced with power steering of conventional type, this invention makes operating the vehicle safer. Accordingly, it is another object to provide an attachment for power steering systems for making their operation safer. It should be noted, too, that the present invention adds additional safety to any power steering system and is intended for convenient, inexpensive installation on any vehicle equipped with power steering.

The objects of the invention thus generally set forth together with other objects and ancillary advantages are obtained by the construction and arrangement shown by way of illustration in the accompanying drawings, in which:

Figure 1 is a diagrammatic illustration of a conventional linkage type power steering system, provided with a brake for interposing resistance to steering shaft movement and a control device therefor;

Fig. 2 is a sectional view of the control device;

Figure 8:
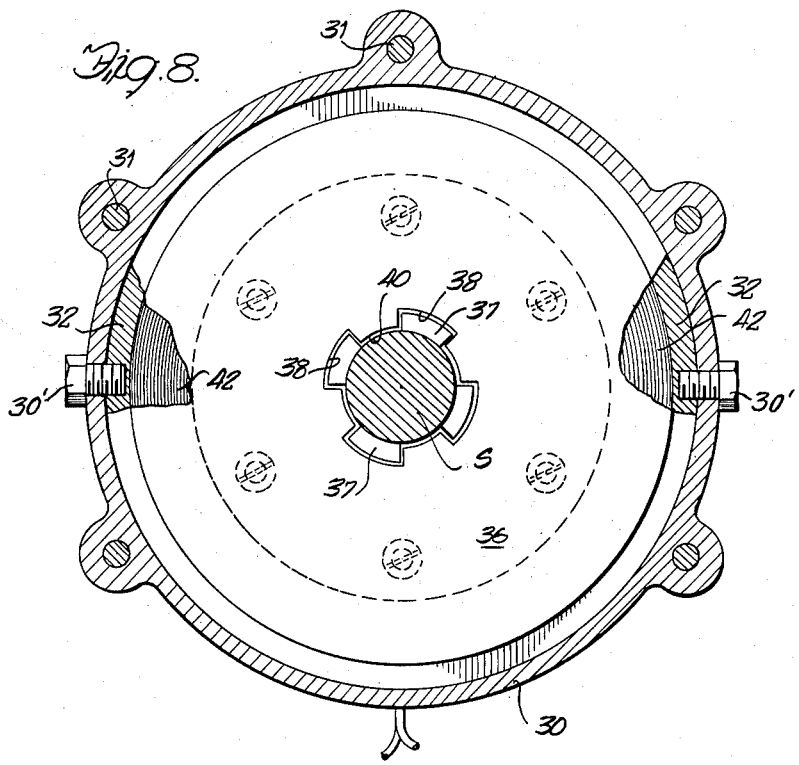
Figure 9:
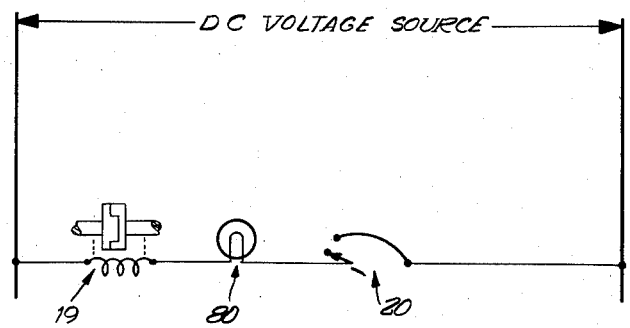

Figs. 3 and 4 are sectional views taken in the plane of lines 3—3 and 4—4 respectively of Fig. 2, and illustrating constructional details of the control device;

Fig. 5 is a sectional view of the device illustrated in Fig. 2 but taken from the opposite side of its casing;

Fig. 6 is an end view of an adjustment means embodied in the control device of Fig. 2;

Fig. 7 is a sectional view of the brake shown in Fig. 1;

Fig. 8 is a sectional view taken in the plane of lines 8—8 of Fig. 7, and illustrating details of the brake;

Fig. 9 is a diagrammatic view of an electrical control circuit including the brake and the control device therefor.

While the invention is susceptible of various modifications and alternative constructions, an illustrative embodiment of the invention will be shown in the drawings herein and described in detail. It is to be understood, however, that it is not thereby intended to limit the invention to the specific form disclosed. It is intended to cover all modifications, alternative constructions, and equivalents falling within the spirit and scope of the invention as expressed in the claims.

Referring more particularly to the drawings, the form of the invention there shown for purposes of illustration is embodied in a power steering system of the type shown in Figure 1 although it will be understood the invention could be incorporated in power steering systems of other types. In general, this system is a linkage type with a power cylinder 11 connected to the front drag link or steering linkage 12 of a motor vehicle steering assembly. The illustrative system also incorporates a pump P, driven by the vehicle engine, which pump constitutes a source providing a variable flow of pressure fluid for the power cylinder 11.

Conventional power steering systems, of which the linkage type shown in Figure 1 is representative, include the power cylinder 11 connected in the vehicle steering system for supplementing manual effort supplied through a steering wheel S and gear G to turn the road wheels W. In general, pressure fluid is conducted from the pump P to the intake I of the power cylinder, and the constantly flowing stream of pressure fluid delivered by the pump P circulates within the housing containing the valve V, the pipes L and r, communicating with the chambers on each side of the piston p', and returned by means of the return line to the reservoir R for the pump. In the operation of the steering system, manual rotation of the shafts by means of the steering wheel S results in a slight axial movement of the valve V from a neutral position (as shown) to effect a change in the pressure conditions in the chambers on each side of the piston, the flow into pipes L and r and the respective chambers being throttled by the valve V to obtain a pressure differential for driving the piston p' and generating power assist to turn the road wheels W.

In the operation of the power steering system shown in Figure 1, which is conventional in this respect, the pump P which delivers fluid under pressure to drive the power cylinder 11, is a variable delivery type pump driven directly by the vehicle engine. Hence, the output of fluid from the pump P is proportional to the rate of rotation of the vehicle engine and to the vehicle speed when the vehicle speed and engine speed correspond. In general, as the vehicle speed increases the output of the pump correspondingly increases. The pump P is designed such that when the vehicle engine idles, fluid is delivered to the power steering system at a rate of flow and pressure producing appreciable force to turn the road wheels. This idle speed at which the pump produces sufficient output to power the power steering system is approximately 400 R. P. M. If the automobile is in gear, this engine speed produces a vehicle speed of about 5 M. P. H. As the engine and vehicle speed increases above this rate, however, the increased rate of flow of pressure fluid delivered from the pump is excess. In other words, the fluid delivered from the pump at speeds above about 10 M. P. H. is superfluous and wasted. Most systems provide a by-pass, ordinarily a check valve, for diverting fluid when dangerous pressures are reached from the outlet side of the pump and passing it directly to the pump return or reservoir rather than through the power cylinder of the power steering system. It is generally considered, however, that hydraulic pressures on the order of 750 p. s. i. at highway vehicle speeds, are required to be present in the hydraulic line leading to the power cylinder in order to be available for operating the power cylinder instantaneously on demand at high vehicle speeds. Fluid pressures are, therefore, permitted to reach and are maintained at this high level, even though substantially lower pressures are ordinarily adequate for operating the power cylinder of the system.

While at relatively low vehicle speeds, as might be experienced in city driving, the pressure in the hydraulic circuit has climbed to a substantial figure and normal steering is not hampered. However, at high vehicle speeds and correspondingly high hydraulic pressures, a very serious side effect to high fluid pressure becomes noticeable. When, for example, the car speed reaches 60 M. P. H. highway speed, the power steering system becomes oversensitive. Due to the fact the power cylinder is instantaneously responsive to movement of the steering wheel, and the manual effort required to move the steering wheel is reduced to practically a zero figure. This is the consequence of increased hydraulic pressure in the hydraulic system and is accompanied by a complete loss of ground feel. Ground feel may be defined as sensitivity to force acting against the wheels by the road surface. The presence or absence of ground feel is important at highway speeds when, if the wheels are turned too sharply, the vehicle may skid or roll over, depending on the condition of the road surface. Furthermore, at such speeds and under such conditions, the steering wheel must be held firmly to prevent even the slightest movement of the steering wheel in order to keep the car under proper control. In other words, the steering system is too responsive and it is difficult for even an experienced driver to properly control the vehicle.

It is well recognized that the effort required to move the road wheels of a motor vehicle is substantially greater when the vehicle is at a standstill or moving at low speeds, for example while parking, than at higher speeds. In fact, a point is soon reached as the vehicle speed increases where the effort required could easily be supplied exclusively by manual effort applied through the steering wheel. While the present invention does not affect the steering effort generated in the power steering system and applied to assist in turning the road wheels, the invention is concerned with restoring resistance to turning the steering wheel at highway speeds to compensate for the loss of ground feel which has occurred. In the present instance, this is accomplished by interposing a resistance to steering shaft movement, and progressively increasing this resistance once a predetermined, relatively low, vehicle speed is reached. The result of interposing resistance to turning the steering wheel at high speeds acts as a steering wheel stabilizer by holding the steering wheel against rotation without the driver's effort and thus prevents the usual "weaving" experienced with the conventional power steering system at high speeds.

In order to accomplish this result, in accordance with the invention it is contemplated to use a magnetic brake 19 coupled to the steering shaft s for interposing a light resistance to steering wheel movement. It is furthermore contemplated to provide means for effecting frictional engagement of the brake members which comprise the brake 19 at a predetermined speed. In the present instance the brake 19 is a magnetic brake operated by a control circuit effective for applying the brake by energizing it electrically and for varying the resistance offered to steering wheel movement by varying the energization of the magnetic brake 19 in accordance with vehicle speed.

As illustrated in Figures 1 through 7, the control 20 is actuated by means located in the hydraulic line returning fluid from the power cylinder 11 to the reservoir R of the power steering system. This actuating means is interposed in the return line so as to be responsive to the rate of flow of hydraulic fluid passing through this line. As described earlier, the pump P, in a conventional power steering system, is a variable output pump driven by the vehicle engine, and thus the output of the pump varies, in general, in accordance with vehicle speed. While under certain conditions the engine and vehicle speeds are not correlated, such as when the engine is raced in accelerating at low vehicle speeds, the pump output provides a convenient measure of vehicle speed, and one sufficiently accurate for the purposes of this system. The control 20 provides means performing the functions of closing the circuit to the magnetic brake 19 upon reaching a predetermined vehicle speed, and increasing the current flow through the circuit to increase the energization of the magnetic brake as vehicle speeds become higher, and embodies a switch-rheostat.

For actuating the switch-rheostat 20 a flow responsive vane 21 is used, pivotally mounted within a housing 22 having a cavity or through passage 23 connecting an inlet passage 24 and an outlet passage 25. These passages are provided for connection in the return line 26 to the reservoir R. In order to bias the vane 21 against fluid flow, a torsion spring 28 may be employed urging the vane to a zero position against a stop 29 provided within the housing of the device, in which position the circuit to the magnetic brake 19 is open.

This control circuit is shown in Fig. 9, and as there depicted is D. C. operated, the voltage source being provided from the vehicle electrical system, and includes the magnetic brake 19 in series with the switch-rheostat 20. In accordance with the present invention, the magnetic brake 19 provides means for interposing relatively slight but perceptible resistance to turning of the steering wheel S. Accordingly, this brake is operably coupled to the steering wheel shaft s, as shown generally in Figure 1, and in more particular detail in Figs. 7–9. Accordingly, turning to these figures, the steering wheel shaft s is journalled within a housing 30 containing the parts of the magnetic brake 19. This housing may be bolted to the frame or chassis of the motor vehicle as by means of bolts 31. In the present instance the slight resistance to steering wheel movement hereinbefore described is provided upon energization of the magnetic brake 19 by means of frictional contact between an annular magnetic core 32 fixed within the brake housing 30, and the rotatable armature discs 35, 36 mounted for rotation by the steering shaft s. The mounting of the armature discs 35, 36 in this arrangement is accomplished by machining the shaft s for a limited longitudinal extent with circumferentially spaced splines 37 received with adequate clearance within slots 38, cut in the central openings 40, of the discs. These discs as shown, are annular in form, supported for turning by the shaft s, and spaced by the stationary core 32 which also contains the brake winding 42. The magnetic core 32 is mounted within the housing 30 and has a central bore of sufficient diameter to provide clearance with the shaft s. The magnetic core 32 is secured within the housing 30 by cap screws 30′ (Fig. 8). By reason of the splined connection between the shaft s and the annular armature discs 35, 36, these discs are supported for relative, but limited axial movement with respect to the stationary core 32 spacing them. Accordingly, the housing 30 provides clearance for limited axial movement of the spaced discs, the presence of such being indicated in Fig. 7.

Upon energization of the brake winding 42, a magnetic field is set up linking a magnetic core 32 and the annular armature discs 35, 36. The effect is to attract the armature discs towards each other and into frictional engagement with the faces of the stationary shoe. Thus, when the circuit including the winding 42 for the magnetic core is open, or when the energization of the winding is relatively low, the armature discs, which function as brake members in cooperation with the core, are either separated from contact with the core, or are in such a slight degree of contact with the core faces as to exert only an inconsequential force on the steering shaft. Such a force might be felt by the driver, however it is appreciably less than the force produced by the brake when operated for the intended function of interposing resistance to turning of the steering shaft so as to simulate ground feel. The term "normally disengaged" as applied to the brake members is meant to embrace either such condition. Moreover, as will be evident to a man skilled in the art, variations in this arrangement may be effected without departing from the essential characterizing function of the invention wherein the brake members are engaged at relatively high speeds for the purpose just specified.

To prevent undue wearing of these surfaces the shoe and the armature discs are made of wear resistant material and the parts where they contact are ground and finished relatively smooth. The frictional resistance to relative movement of the brake parts is determined by various factors including the coefficients of friction between the meeting parts, and the nature of the magnetic material from which the brake parts are made. This magnetic brake 19 comprising the winding 42, the magnetic core 32, and the armature discs 35, 36 provides means for introducing a relatively small but perceptible frictional resistance to movement of the steering shaft s. In other words, the magnetic brake 19 provides a slight friction load on the steering shaft s resisting turning movement of the shaft which resistance to movement is felt in turning the steering wheel S. The amount of this resistance may be varied to produce the amount of resistance desired by adjusting various coefficient factors. Among these are the strength of the magnetic field set up by the winding and magnetic core, which may be varied by reducing or increasing the number of turns in the winding and by using a different magnetic material for the core. However, since this is a friction brake, the friction force developed remains substantially constant irrespective of the rate of turning the steering shaft, assuming the condition of substantially constant pressure of contact between the meeting friction surfaces at a given speed, and ignoring the momentarily higher friction force due to static as compared with dynamic friction. While as pointed out hereinbefore, the amount of resistance to steering wheel movement may be adjusted as desired, it is contemplated that at high way speeds (35 M. P. H. to 75 M. P. H.), this system should provide a resistance felt as between six and seven pounds' pull on the rim of the steering wheel.

In an exemplary form of this invention the resistance interposed to turning of the shaft s is progressively increased from a relatively low value obtained when the circuit to the brake is closed by the switch-rheostat 20. This relatively low, initial value of resistance, obtained at a predetermined relatively low vehicle speed, may be adjusted as desired. The predetermined speed at which the control is actuated may also be adjusted or varied, from 0 M. P. H. to relatively high speeds, but it is contemplated that the switch-rheostat 20 will be actuated at approximately 35 M. P. H. Where the system is so constructed that the circuit is closed and the winding 42 initially energized at a predetermined speed of 0 M. P. H., it will be evident that this winding is continuously energized while the vehicle is in operation. In keeping with the foregoing control 20 provides in addition to its switching function, an electric current varying function operated in response to vehicle speed. In this arrangement, the rheostat 50 of the control 20 introduces a large electrical resistance into the control circuit including the switch-rheostat 20 and the magnetic brake 19 at predetermined low vehicle speed. Automatically as speed increases above that low speed, and in proportion to the increase, the rheostat 50 reduces the amount of electrical resistance in the circuit.

As shown in Figs. 2–6, the interior of the housing of the switch-rheostat 20 receives a swinging vane 21 which is pivotally mounted to turn about the axis of a hub 51 fashioned at one end of the vane. The hub seats within a round bore 52 provided in the housing 22 itself, abutting against an adjustable plug 53. The housing 22 may be made of a conducting material and likewise the plug 53 such that the vane 21 operates at ground potential so long as the housing is fastened to the vehicle chassis frame. In order to bias the vane 21 to a zero position, the solid line position of Figure 2, as above described a torsion spring 28 is employed one end of the spring being seated permanently within a small diameter axial bore 54 in the hub 51 of the vane itself, the other end of which is received in a similar small diameter axial bore 55 in the plug 53. Referring now to Fig. 6, in order to adjust the spring tension and thus of the force biasing the vane, the plug 53 is constructed with a lateral flange 57 scalloped about its periphery with a series of half-round cutouts 58. After determining the spring tension desired, the plug 53 is turned to the position providing the desired tension, and a button-head screw 59 inserted through the half-round cutout then alined with a tapped opening 60 provided in the housing 22 of the device, and the screw 59 threaded into place to lock the plug 53 in that position.

For the rheostat 50 a resistance coil 61 is positioned within an arcuate groove 62 hollowed out in a raised part of the cover 63 of the housing 22. This cover 63, unlike the housing proper, is made of an electrical insulating material of the type, preferably, that may be easily molded into the form of the cover. One end of the resistance coil 61 in this arrangement is seated directly on a round plug 64 extending from a terminal binding post 65 fastened in the cover 63 and leading outside. The terminal binding post 65 is provided for connecting the switch-rheostat 20 in circuit with the brake 19. The flat base 66 of this binding post, as shown in Figs. 2 and 3, lies under the lower end of the vane 21 when the same assumes its high rate of flow position, the dotted position in Fig. 2, in this position the vane electrically shorting out the resistance coil 61. The resistance coil 61 seats at its other end on a round plug 68 of insulating material also fastened within the cover 63. This plug 68 insulates the end of the resistance coil 61 and also provides a flat insulating island 70 lying under the vane 21 when it is biased to its zero position. In this position of the vane 21, the vane and the housing 22 for the switch-rheostat 20 are electrically insulated from the resistance coil 61, and thus this switch-rheostat 20 is open circuited. In other words, with the vane 21 in the zero position of Fig. 2, the control device operates as an open switch.

The switching function of the switch-rheostat 20 is performed by the vane 21 pivoting off the insulating island 70 into electrical contact with the series of turns of the resistance coil 61 adjacent thereto. As the vane pivots to contact successive turns of the coil, the length of coil in circuit is reduced, and correspondingly, the electrical resistance in circuit. To obtain improved electrical contact with the resistance coil 61, the lower edge of the vane 21 is bored to receive a plunger 75 of conducting material such as copper or brass biased outwardly towards such contact by a compression spring 76.

As shown in Fig. 9, a diagrammatic illustration of the control circuit of this invention, the switch-rheostat 20 and the winding for the magnetic brake 19 are connected in series with a signal lamp 80, also serving a current limiting function. This signal lamp is included for the purpose of providing a visual indication when the control circuit is operating. Moreover, the lamp may be mounted on the dashboard of the vehicle, functioning also to warn the driver that the vehicle is travelling in excess of the predetermined speed at which the switch-rheostat is actuated to close the circuit. While as shown a common filament type lamp may be used, other conventional warning devices might be used such as an audible buzzer or the like. Since the current through the circuit increases after the switch of the switch rheostat 20 closes at a predetermined relatively low vehicle speed, the glow from this lamp becomes brighter as vehicle speeds increase.

It will be understood, also, that the electrical circuit illustrated diagrammatically in Fig. 9, in actual practice would be arranged with the car battery in series with the three components illustrated, the switch-rheostat 20, magnetic brake 19, and the signal lamp 80. The housing for the switch-rheostat 20 would be grounded, as likewise is the vane 21, moving in the non-conducting pressure fluid ordinarily mineral oil, passing through the return line from the power cylinder and leading to the reservoir R and the pump P.

I claim as my invention:

1. In a vehicle power steering system, the combination comprising a steering shaft which steers the vehicle through the agency of the road wheels when turned manually, a normally disengaged friction brake for interposing a resistance to turning the steering shaft comprising, brake members, one secured against movement to a fixed part of the vehicle, another coupled for rotation by said shaft, said brake being effective when engaged to interpose a fixed value of resistance which remains substantially constant at a given vehicle engine speed irrespective of the rate of turning of the steering shaft, and means for effecting frictional engagement of said members including a vehicle engine speed responsive control, said means being effective for operating said brake at a pre-determined vehicle engine speed.

2. In a vehicle power steering system having a power unit operated by a variable delivery pump driven by the vehicle engine, the combination comprising, a steering shaft, a magnetic friction brake for interposing resistance to turning the steering shaft, said brake comprising a magnetic core secured against rotation and mounted concentric with the steering shaft, a winding for said core, an armature disc coupled for rotation by said steering shaft, said core and said armature disc being supported for relative movement and frictional engagement upon energizing the winding and setting up a magnetic field linking the said core and armature disc, an actuating member responsive to rate of flow of fluid from said pump, and a normally open electric circuit including a source of voltage, the winding for the magnetic core, and a switch, said switch being operated by said actuating member for closing said circuit upon the engine speed and flow from said pump attaining a predetermined rate.

3. In a vehicle power steering system having a power unit operated by a variable delivery pump driven by the vehicle engine, the combination comprising, a steering shaft, a magnetic friction brake for interposing resistance to turning the steering shaft, said brake comprising a magnetic core supported by a fixed part of the vehicle adjacent the steering shaft, a winding for said core, an armature disc coupled for rotation by said steering shaft, said core and said armature disc being supported for relative movement and frictional engagement upon energizing the winding and setting up a magnetic field linking said core and armature disc, a hydraulic fluid circulating circuit connecting said pump and said power unit, an actuating member responsive to rate of flow of fluid from the pump circulating through said hydraulic fluid circulating circuit, and a normally open electric circuit including a source of voltage, the winding for the magnetic core, and a switch in said electric circuit operated by said actuating member for closing said circuit upon the engine speed and flow from the said pump attaining a predetermined rate.

4. In a vehicle power steering system having a power unit operated by a variable delivery pump driven by the vehicle engine, the combination comprising, a steering shaft, a friction brake for interposing resistance to turning the steering shaft, said brake comprising brake members, one of said members being secured against rotation and mounted on a fixed part of the vehicle, and another of said members being coupled for rotation by said steering shaft, and means for operating said brake at a predetermined engine speed and rate of flow from said pump, including a normally de-energized winding effective when energized to frictionally engage said brake members, an actuating member responsive to rate of flow of fluid from the pump, and an electric circuit including a source of voltage, the winding for engaging the brake, and means operated by said actuating member for closing said electric circuit said last-mentioned means energizing the winding upon the engine speed and flow from said pump attaining said predetermined rate, said brake being effective when operated to interpose a fixed value of resistance which remains substantially constant at a given engine speed irrespective of the rate of turning of the steering shaft.

5. In a vehicle power steering system having a power unit operated by a variable delivery pump driven by the vehicle engine, the combination comprising, a steering shaft, a magnetic friction brake for interposing resistance to turning the steering shaft, said brake comprising a magnetic core secured against rotation and mounted concentric with the steering shaft, a winding for said core, an armature disc coupled for rotation by said shaft, said core and said armature disc being supported for relative movement into frictional engagement upon energizing the winding and setting up a magnetic field linking the said core and armature disc, a hydraulic fluid circulating circuit connecting said pump and power unit, a vane in said circuit responsive to rate of flow of fluid from the pump, and a normally open electric circuit including a source of voltage, the winding for the magnetic core and means operated by said vane for closing said circuit, said means energizing said winding upon the engine speed and flow from said pump attaining a predetermined rate.

6. In a vehicle power steering system having a power unit operated by a variable delivery pump driven by the vehicle engine, the combination comprising, a steering shaft, a magnetic friction brake for interposing resistance to turning the steering shaft, said brake comprising a magnetic core secured against rotation and mounted concentric with the steering shaft, a winding for said core, an armature disc coupled for rotation by said shaft, said core and said armature disc being supported for relative movement into frictional engagement upon energizing the winding and setting up a magnetic field linking the said core and armature disc, an actuating member responsive to rate of flow of fluid from the pump, and a normally open electric circuit including a source of voltage, the winding for the magnetic core, and a switch-rheostat, said switch-rheostat being operated by said actuating member for closing said circuit and energizing said winding upon the engine speed and flow from said pump attaining a predetermined rate and for varying the energization of said winding in accord with vehicle speed upon flow from said pump exceeding the predetermined rate.

7. In a vehicle power steering system having a power unit operated by a variable delivery pump driven by the vehicle engine, the combination comprising, a steering shaft, a magnetic friction brake for interposing resistance to turning the steering shaft, said brake comprising a magnetic core secured against rotation and mounted concentric with the steering shaft, a winding for said core, an armature disc coupled for rotation by said steering shaft, said core and said armature disc being supported for relative movement and frictional engagement upon energizing the winding and setting up a magnetic field linking the said core and armature disc, an actuating member responsive to rate of flow of fluid from said pump, and a normally open electric circuit including a source of voltage, the winding for the magnetic core, and a switch, said switch being operated by said actuating member for closing said circuit upon the engine speed and flow from said pump attaining a predetermined rate, and an electric signal for indicating that the circuit is closed.

(References on following page)

References Cited in the file of this patent

UNITED STATES PATENTS

| | | | |
|---|---|---|---|
| 1,801,851 | Farmer | Apr. 21, | 1931 |
| 1,801,908 | Down | Apr. 21, | 1931 |
| 1,804,333 | Gregoire | May 5, | 1931 |
| 1,828,425 | Mathews | Oct. 20, | 1931 |
| 2,063,920 | Friestedt | Dec. 15, | 1936 |
| 2,191,125 | Collins | Feb. 20, | 1940 |
| 2,248,251 | Reeves | July 8, | 1941 |
| 2,311,010 | Vickers | Feb. 16, | 1943 |
| 2,513,868 | Hill | July 4, | 1950 |
| 2,587,377 | Penrose | Feb. 26, | 1952 |
| 2,707,394 | Lewis | May 3, | 1955 |
| 2,761,326 | Herbenar | Sept. 4, | 1956 |